Jan. 20, 1953　　　　　F. W. SIDE　　　　　2,626,296
GALVANOMETER
Filed Jan. 30, 1947　　　　　　　　　　　　　　3 Sheets-Sheet 1

INVENTOR.
FREDERICK W. SIDE
BY
ATTORNEY.

Jan. 20, 1953     F. W. SIDE     2,626,296
GALVANOMETER
Filed Jan. 30, 1947     3 Sheets-Sheet 2
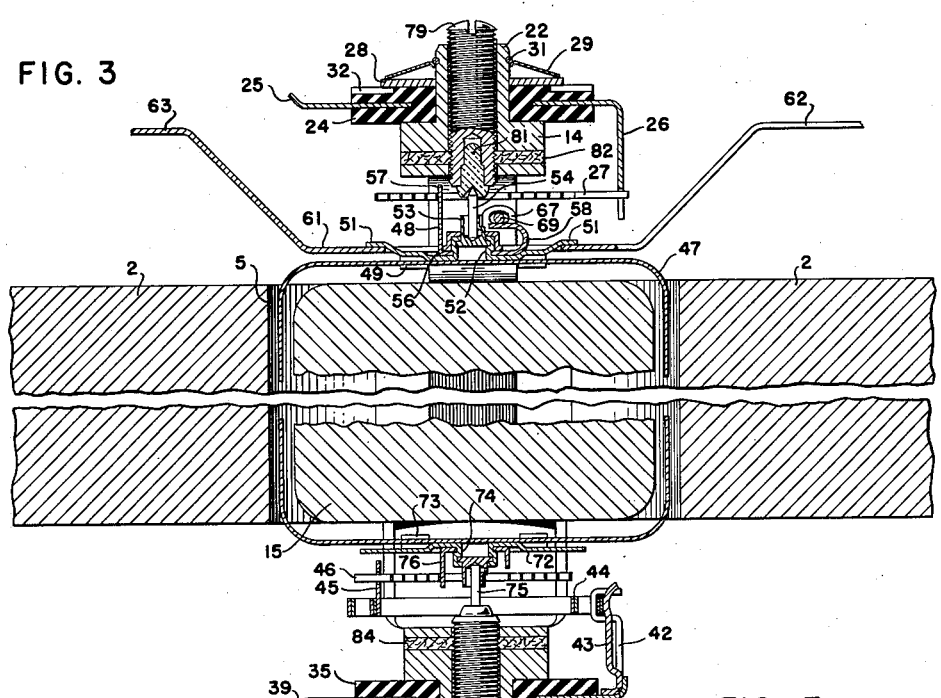
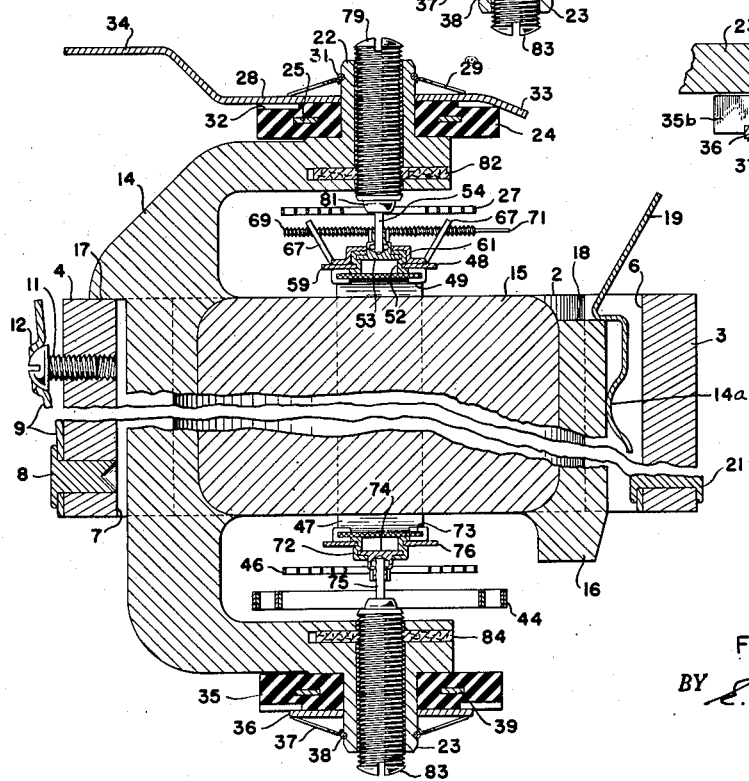
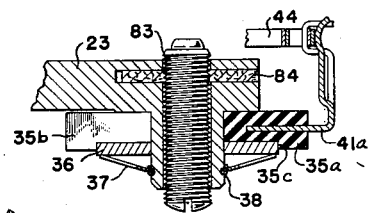
*INVENTOR.*
FREDERICK W. SIDE
BY *E. Wellford Mason*
ATTORNEY.

Jan. 20, 1953     F. W. SIDE     2,626,296
GALVANOMETER
Filed Jan. 30, 1947     3 Sheets-Sheet 3
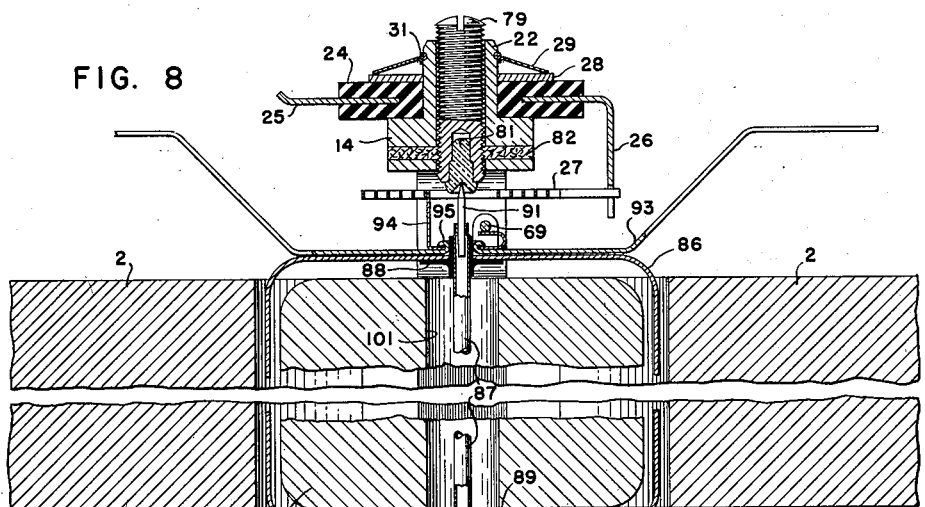
FIG. 8
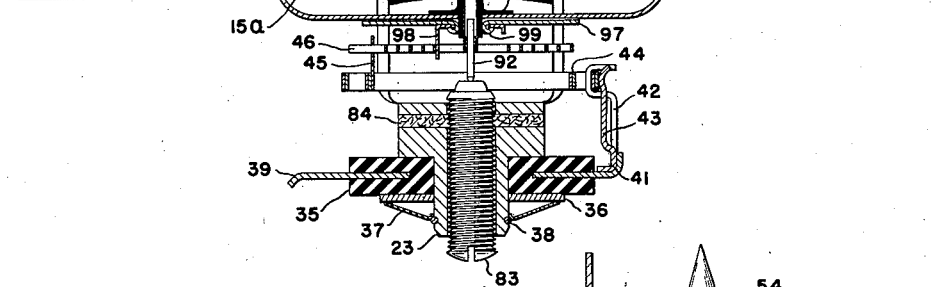
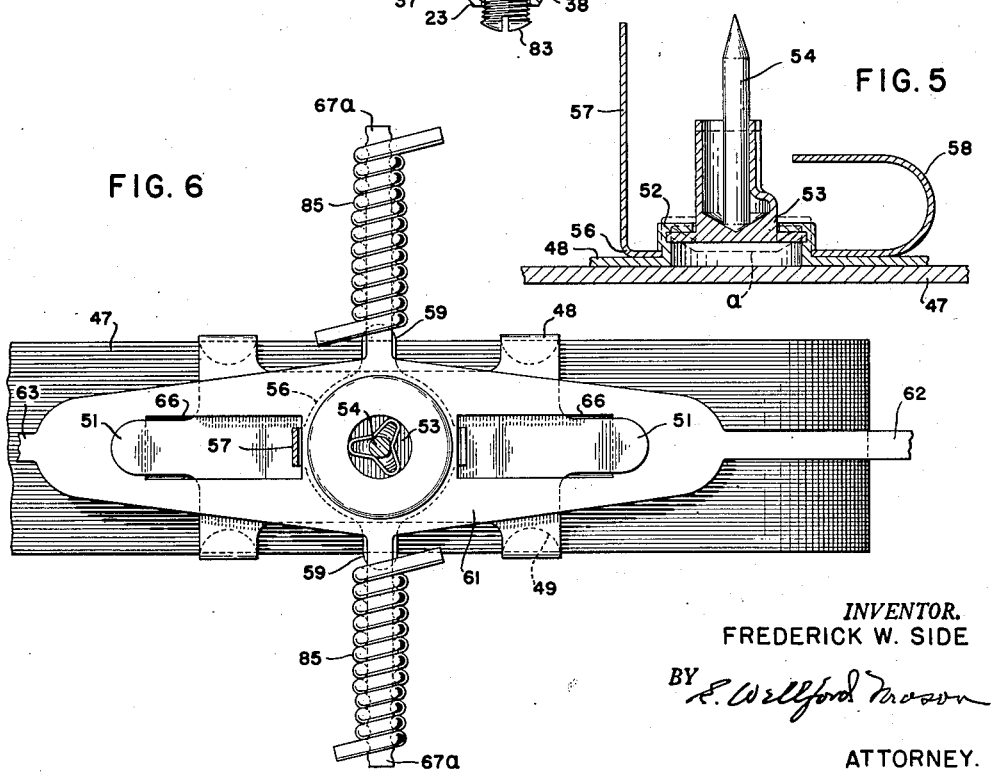
FIG. 6
FIG. 5
*INVENTOR.*
FREDERICK W. SIDE
BY
ATTORNEY.

Patented Jan. 20, 1953

2,626,296

UNITED STATES PATENT OFFICE 2,626,296

GALVANOMETER

Frederick W. Side, Philadelphia, Pa., assignor, by mesne assignments, to Minneapolis-Honeywell Regulator Company, Minneapolis, Minn., a corporation of Delaware Application January 30, 1947, Serial No. 725,195

10 Claims. (Cl. 171—95)

The present invention relates to galvanometers, and is particularly directed to the construction of a galvanometer that is both accurate and rugged, and one which is easily assembled.

It is an object of the present invention to provide a galvanometer that is sensitive to small changes in electromotive force that are supplied to it, and yet is rugged enough to withstand ordinary handling. It is a further object of the invention to provide a galvanometer that may be readily assembled with a minimum of adjustments. It is a further object of the invention to provide a galvanometer which may be quickly and easily disassembled for cleaning and repair. Upon reassembling the instrument the parts will be returned exactly to their original positions with respect to each other. It is a further object of the invention to provide a galvanometer in which means is provided whereby the necessary calibrating adjustments may be easily and quickly made.

The galvanometer of the present invention is so made that the various components thereof are easily assembled into an unusually rugged and sensitive device. In the manufacture of the instrument the magnet and the pole pieces are permanently fastened together and machined to receive accurately the moving coil assembly. There is provided a bracket to which a core is integrally attached and upon which the coil is pivoted. To this end the bracket is formed with sleeves in which jewel bearing screws are placed to support the coil. These sleeves also serve to locate the hair spring supports and the insulated terminals for the coil. The coil itself has attached to it in a novel and easily assembled fashion the pointer and the pivots which are received by the jewel bearings.

Features of novelty lie in the manner in which the moving coil assembly including the bracket and coil and attached parts are mounted in the magnet assembly as well as in the details of various of the parts that are used in the construction of the instrument as a whole.

It is a further object of the invention to provide a circuit for the galvanometer which will permit it to take advantage of the higher magnetic fields produced by modern magnet materials without affecting its speed of response. With the circuit disclosed herein the galvanometer, when using a stronger magnetic field, has greater sensitivity and speed of response without overshooting than is obtained with galvanometers not having the benefit of the stronger magnetic fields.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 3 is a view taken on line 3—3 of Figure 1,

Figure 4 is a view taken on line 4—4 of Figure 1,

Figure 5 is an enlarged view, in section, of a portion of the moving coil in process of assembly, Figure 6 is an enlarged top view of the moving coil assembly with a modified counterweight, Figure 7 is a view of a modified form of spring supporting member, and Figure 8 is a view similar to Figure 3 of a modified form of galvanometer.

Figure 1:
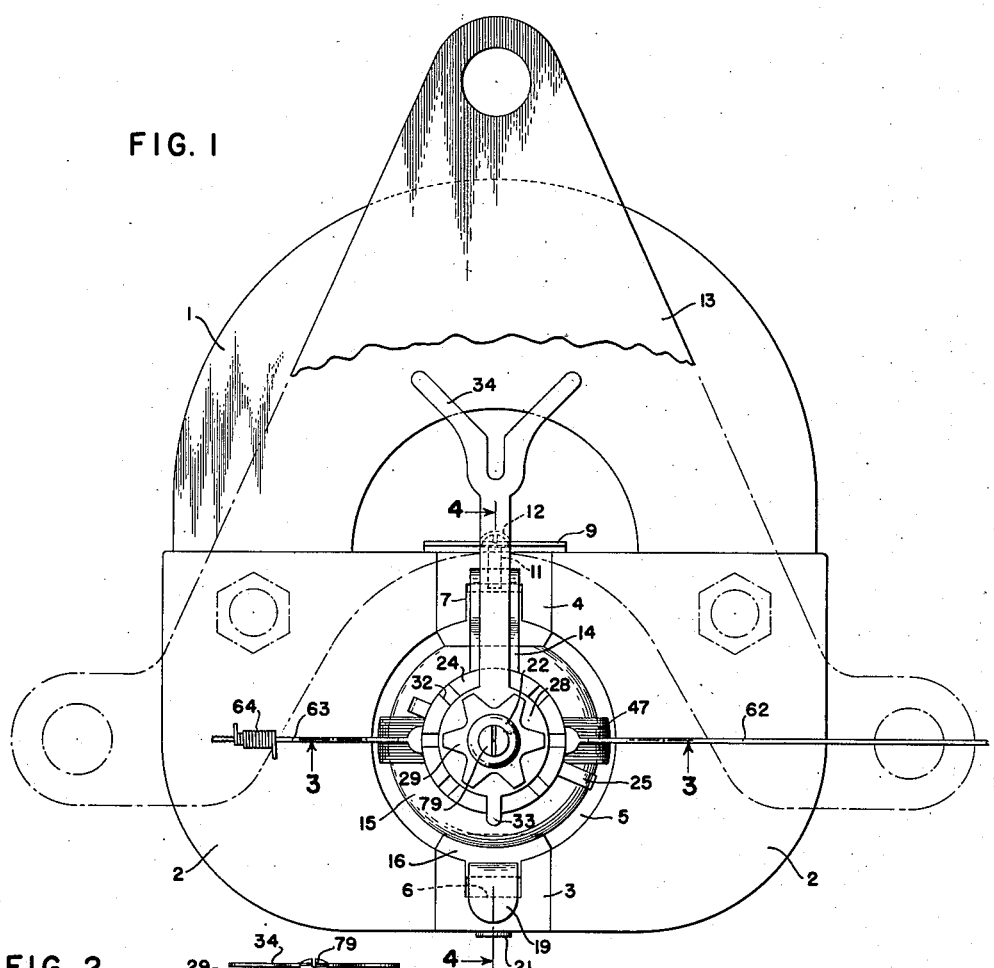
Figure 1 is a top view of the galvanometer.

Referring first to Figures 1 to 4 inclusive, there is shown a conventionally horseshoe magnet 1 that is preferably made of a modern alloy which has a strong magnetic field. Attached to this magnet are iron pole pieces 2 and brass spacers 3 and 4. The magnet, the pole pieces, and the spacers are integrally joined with each other by a suitable welding process. After the parts have been joined a suitable machine is used to form a cylindrical opening 5 between the pole pieces. After that suitable machines, such as broaching machines, are used to form slots 6 and 7 in the spacers 3 and 4 respectively. These slots are accurately formed so that when the moving coil assembly is inserted, said assembly will be concentric with opening 5. A magnetic shunt is used to adjust the flux between the pole pieces, and to this end there is attached to the back of the spacer 4 by means of a rivet 8 a magnetic shunt 9. As best shown in Figure 4, the magnetic shunt overlies the edges of each pole piece and may be adjusted toward and from the pole pieces by a screw 11, the head of which engages a depression 12 in the shunt, which depression has a hole in it through which a screw driver may be inserted. As the screw is threaded into or out of its opening in spacer 4 the shunt member is brought closer to or moved further from pole pieces 2. A mounting plate 13 may be attached to the magnet assembly by means of suitable bolts. This plate is used to hold the galvanometer in its proper position in a suitable casing.

The moving coil assembly is supported on a C- shaped bracket 14 of non-magnetic material that has integrally connected to it a core 15 of magnetic material, which in turn has fastened to it a front piece 16 of non-magnetic material. These parts are integrally attached to each other by some suitable process such as welding and are then machined to fit in the spaces provided therefor in the pole piece assembly. The core 15 is accurately machined so that it will leave two half ring-shaped spaces, through which the coil may move in the cylindrical opening 5. Front piece 16 is accurately machined so that its sides will be received in the sides of slot 6. The bracket 14 is accurately machined so that its sides will be received in slot 7. Parts 16 and 14 being received in slots 3 and 4 insure that core 15 will be concentrically spaced in the central opening 5. In order to have the core moved to exactly the right position axially of the opening, there is provided a shoulder 17 which engages the upper surface of spacer 4. There is also provided a shoulder 18 on the front piece 16 over which a latch 19 is moved. This latch is attached to the front spacer 3 by means of a rivet 21. When the pole piece assembly is moved into place the latch 19 will snap over the edge of shoulder 18 and thus hold the moving coil assembly in place. Latch 19 also serves to move the entire assembly to the left in Figure 4 to help insure the proper concentric location of core 15. This is accomplished by forming the latch member so that its central portion is bulged as at 14a so that the part 16 is engaged only at its mid-point. The upper end of the latch engages only surface 18.

The upper and lower portions of bracket 14 are provided with tubular projections 22 and 23 respectively. These tubular projections or extensions serve to locate the adjusting and terminal members for the moving coil and also serve to locate the jewel bearing screws upon which the core is pivoted. Surrounding projection 22 is an insulating member 24 which has a contact 25 embedded in it. One end of the contact projects to the left in Figure 3 so that a lead to the galvanometer may be attached to it. The outer end of the contact is bent downwardly as at 26 and has the outer end of a torque restoring hair spring 27 attached to it. Above the insulating member is an adjusting member 28 which is frictionally held against member 24 by a spring washer 29. These three parts are held on the projection 22 by a suitable retaining ring 31. The insulating member 24 is provided with a series of radially extending notches 32 into any one of which a tongue 33 formed on member 28 may be moved, as is best shown in Figures 1 and 4. Extending diametrically from member 28 opposite tongue 33 is an adjusting fork 34. In adjusting the zero position of the moving coil, fork 34 is rotated and through tongue 33 rotates insulating member 24. As this member rotates it will act through 26 to move spring 27. When arm 34 has been adjusted to the end of the movement permitted, tongue 33 will be lifted out of one of the notches 32 and moved back relative to member 24 to the next notch. This will permit member 34 to be moved again in the original direction so that spring 27 may be shifted to the proper position.

The lower projection 23 has mounted upon it an adjustable insulating member 35 similar to that described above at 24, a retaining washer 36 that is held in place by a spring washer 37, and a retaining ring 38. Insulating member 35 has in it a contact 39 that is similar to contact 25 except that the part corresponding to 26 is cut off as best shown in Figure 3 of the drawing. Attached to the bent over end of the contact 39 is a part 41 which is formed of a pair of shaped arms 42 and an arm 43. Arms 42 are bent so that their upper portions are shaped like a C whereas, arm 43 is bent so that it would normally move to the left of arms 42 in Figure 3 of the drawing. In assembling the device arm 43 is moved to the right of arms 42 and the end of a bi-metallic compensating spiral 44 is passed through the loop formed between arms 42 and arm 43. The inner end of the compensating spiral has fastened to it the lower end of a support whose upper end is fastened to the outer end of a second torque restoring hair spring 46. In assembling this portion of the instrument the bi-metallic spiral is moved between arms 42 and arm 43 until the proper free length is obtained. Thereafter a drop of solder may be placed across this joint to prevent future change in length thereof. Member 35 is then rotated until part 41 is in the proper position to tension place spring 46 under the same tension as spring 27. As the spiral 44 changes in length due to change in temperature to which the instrument is subjected, hair spring 46 will be wound or unwound to shift the zero of the moving coil.

With the construction shown in Figures 1 to 4 it is necessary to assemble the parts on the lower projection 23 and the bi-metallic spiral 44 and hair spring 46 in two steps. First parts 35 to 38 are placed on the projection by moving them upwardly over the projection. Next an assembly consisting of parts 41 to 46 are moved into position from the right in Figure 3 of the drawing. These parts are then joined together by soldering the lower end of part 41 to the right end of terminal 39. In some cases it may be desirable to assemble the terminal, the bi-metallic element, the hair spring and insulating member as a single unit prior to the time that they are placed into position on bracket 14. When this is does the parts will be constructed as shown in Figure 7 of the drawing. Insulating member 35a is similar to member 35 above described except that it has a U-shaped slot formed in it by means of which this insulating member may be moved transversely toward the left in Figure 7 to a position in which it surrounds projection 23. Molded in this insulating member is a combination terminal and support 41a which in effect is the same as parts 39 and 41 made in one piece. The upper end of part 41a to which the bi-metallic spiral is fastened is formed in exactly the same fashion as part 41. Therefore all of these elements may be assembled as a unit prior to the time that they are moved into position by sliding insulating member 35a toward the left around projection 23. In order to insure that the insulating member will be properly supported and that therefore the parts will be in concentric relation with projection 23, this insulating member is made with a recess 35c which is of a diameter equal to that of member 36. Therefore when member 36 is placed on projection 33 by moving it vertically upward, it will partially or completely lie within recess 35c to hold part 35a concentric with projection 23. The washer is held in its position by means of spring washer 37 and a retaining ring 38. The difference between the construction disclosed in Figure 7 and that previously described is only in the manner in which the terminal member and the insulating member is shaped. The galvanometer itself is exactly the same in both cases. The change merely permits a different method of assembly which, in some cases, may be more convenient.

The moving coil 47 itself is formed of enough turns of insulated wire to be rigid and to give the desired electrical characteristics. Ordinarily the wire is wound around a suitable form and is backed so that it will retain its shape. Since the wire is insulated, each turn is insulated from the other and the mounting assemblies can be attached thereto without short circuiting the coil.

The top of coil 47 has attached to it an assembly for the pointer, the pivot, and one terminal leading to the coil. To this end there is provided a plate 48 (see Figures 3, 4 and 6) which has four projections 49 on it that are bent around under the coil to attach this part rigidly to the coil. The plate is formed with a depression 52 into which there is placed a cup shaped pivot supporting member 53 that has the pivot 54 projecting therefrom. Care is exercised to make sure that the pivot support is correctly located on the coil. The pivot supporting cup and member 48 are assembled before 48 is attached to the coil. Initially cup 53 has its bottom slightly dished as shown by dotted line a in Figure 5. Members 48 and 53 are then placed in a suitable press along with a terminal member 56 that has an opening in it which surrounds the depression 52 formed in member 48. These three parts are forced together so that the dished shaped portion of cup 53 is formed until it is flat and binds slightly into the interior wall of the depression 52. This same action forces the depression over against the upper edge of terminal member 56 so that the parts are rigidly assembled in a unitary piece as is shown in Figure 5 of the drawing. The upper portion of the cup is shaped as is shown in Figure 6 so that three surfaces thereof engage the outer surface of pivot 54. This construction insures that the pivot will be concentrically located in the cup and will be held in that position frictionally by the engagement of the edges of the cup with the sides of the pivot. Terminal member 56 is provided with an upstanding portion 57 that is attached to the inner convolution of hair spring 27 and with a curved extension 58, the purpose of which will be described below. Member 56 is also provided with a pair of terminal lugs 59 to one or the other of which one end of the coil is attached. Current will then flow from one end of the coil through terminal 59, hair spring 27, arm 26 and contact 25 to one point in the circuit in which the galvanometer is connected.

A pointer member 61 is placed over the assembly as shown best in Figure 3. The pointer member is provided with a depression that is received by depression 52 of member 48 and an opening through which cup member 53 extends and is thus accurately located in the assembly. This member has a pointer 62 projecting in one direction and an extension 63 projecting in the opposite direction upon which a counterweight 64 is mounted. As best shown in Figure 6 the pointer member is provided with two openings 66 through which extensions 51 of member 48 project. The pointer member is held in position by bending the extensions 51 down against the pointer as is best shown in Figures 3 and 6.

If the galvanometer is to be used with the pointer extending in a vertical direction one type of counterweight is used, whereas if the galvanometer is to be used its pointer extending in a horizontal direction another type of counterweight will be used. The counterweight used for a horizontally extending pointer will first be described. In order to support the counterweight the pointer is provided with a pair of arms 67 that project upwardly from the sides therefrom as best shown in Figure 4. These arms are provided with openings through which a threaded counterweight 69 extends. This counterweight has a portion 71 on one end by means of which it may be rotated to shift the weight to one side or the other of the pivot point. Curved arm 58 of the terminal member 56 bears on the underside of the counterweight, as best shown in Figure 3, to prevent accidental rotation thereof. If the galvanometer is to be used with the pointer extending in a vertical direction, a counterweight of the type shown in Figures 3 and 4 cannot be used since it does not extend directly across the pivots. In this case the pointer is formed with extensions 67a as shown in Figure 6 of the drawing, which are in line with pivots 54. These extensions have threaded upon them counterweights 85 that take the form of small helically wound coils. It will be noted by reference to Figure 6 that the outer end of each counterweight has slightly smaller convolutions than the inner end thereof. This is done so that when the counterweight is moved on one of the arms 67a the larger diameter convolutions will act as a guide therefor. The small diameter convolutions will engage the projections 67a, and as the counterweight is rotated it will cut threads therein so that the counterweight will rigidly be held in place. The only difference between the construction for a galvanometer having a vertical or horizontal pointer is in the shape of the pointer member 61 and the type of counterweight used. This means that regardless of the plane the galvanometer pointer is to be used in the parts with these exceptions will be interchangeable. It is noted that when counterweights 85 are used that the curved arm 58 will be removed from terminal member 56.

The lower portion of the coil 47 has attached to it a member 72 similar to member 48 except that the extensions 51 remain parallel to the lower surface of the coil. This member also has a pivot support 74 attached to it in a manner described in connection with part 48, and a terminal member 76 fastened to it in a manner similar to that in which terminal member 56 was fastened to member 48. The terminal member has a downwardly extending part 76 which is fastened to the inner convolution of hair spring 46. The other end of the coil from that attached to a lug 59 on member 48 is attached to a similar lug on member 72. The electrical path for this end of the coil extends through terminal member 76, hair spring 46, connecting member 45, bi-metallic coil 44 and its support 41 to terminal 39, that may be connected to the other lead of the galvanometer circuit.

Upper pivot 54 is received in a jewel screw 79. This jewel screw is located in the opening formed in the tubular projection 22 of frame 14. It is noted that the opening of this tubular projection is of a diameter that will slidably receive the jewel screw and locate it concentrically above the pivot. This screw is held in place in the frame by a fibre washer 82 that is slid into a cut provided in the frame as best shown in Figure 4. The fibre washer has an opening in it that is slightly smaller in diameter than the jewel screw so that as the screw is moved into place it will cut its own threads in the fibre washer and thereby be retained in place. If for some reason the galvanometer is to be disassembled the fibre washer may be discarded and a new one used when it is assembled. This means that there is no chance for the threads to become worn so that the screw may become loose and inaccurate. A feature of the jewel screw is the manner in which jewel 81 is placed in its lower end. It will be seen that the jewel has a conical depression in it which depression receives the end of pivot 54. An inspection of the drawing will show that the bottom of this depression does not extend back into the opening of the screw itself. Since the entire bearing is beyond the end of the screw, light will shine through the jewel so that the bearing and the pivot point may readily be inspected after the instrument has been assembled to ascertain whether or not the pivot is properly seated.

The lower pivot 75 is received in a jewel bearing 83 similar to bearing 79 which was described above. This jewel screw is also guided by an opening formed in extension 23 of frame 14 and is also threaded through a fibre washer 84 that is placed in a slot cut into the bracket.

From the above description it will be seen that the magnet assembly and the moving coil assembly may readily be moved into and out of engagement with each other merely by moving the latch 19 to the right in Figure 4. The parts are accurately machined so that they will always be exactly lined up with respect to each other. It is also noted that one moving coil assembly may be substituted for another in a given magnet assembly if it is desired because of the accuracy with which the various parts are made. The coil supporting pointer and counterweight assembly are made out of very thin material. Because of the extreme thickness of this material the inertia of the parts is small and, also, they may be rigidly fastened together with a minimum of trouble. By having the various parts of this assembly so shaped that they interlock with one another the possibility of them becoming misaligned is minimized. Another feature of the invention is the use of a particular type of pivot support and jewel bearing that has been described. Since the jewel bearings are guided by openings which are accurately machined in the bracket, and the pivots are held in a vise-like member that is absolutely concentric with the coil, the coil will therefore move concentrically through the magnetic field and its accuracy throughout the scale is increased.

In some cases it may be desirable to make a galvanometer which is more sensitive than that described above. This can be accomplished by winding a coil which is lighter and which has a fewer number of turns. For ordinary purposes such a coil has the disadvantage of being unable to sustain its own weight plus that of the pivots and pointer. In order to overcome this fault of an extremely sensitive galvanometer the coil may be wound as shown in the embodiment of the invention of Figure 8. In this case coil 86 is wound so that it is supported by a tubular shaft 87. To this end the shaft has cemented in suitable fashion near its ends a pair of insulating members 88 and 89. As the coil is wound its turns are laid upon and cemented to the insulating members. Thus, the coil is kept in shape and the weight of the terminals and pointer are supported by the tubular shaft 87. Each end of the supporting shaft is formed to grip a pivot 91 or 92 at three points in the manner in which the pivots of the previously described embodiments were gripped. This insures that the pivots will be maintained in an exactly concentric position with respect to the coil. Pointer 93 has fastened to it a terminal member 94. The fastening is accomplished by curling over the inner edge of a perforation which is formed in the pointer as is shown at 95. This assembly is then placed over the end of insulating member 88 and cemented to the top of the coil. The pointer assembly also serves to make the coil more rigid. In Figure 8 there is shown a counterweight of the type described in connection with the embodiment of Figures 3 and 4. It is obvious that a counterweight of the type shown in Figure 6 may also be used if desired. The lower face of the coil has a member 97 cemented to it, which member serves to make the coil more rigid and supports lower terminal 98 by means of a turned over portion 99 as shown in the drawing.

Because of the fact that the coil itself is supported by an axially extending tubular member 87, it is necessary to form a slot in the core 15a in order that the coil may be moved into place. Such a slot is indicated in the drawing at 101. Preferably this slot would be a narrow one that would extend through the part 16 and the front half of core 15a. The remainder of the galvanometer, namely, the magnet assembly, the bracket 14 and the insulating and adjusting members, are exactly the same as those described above in connection with the previous embodiment of the invention. The only difference between this embodiment and the previous one is the manner in which the coil itself is made. One other difference that may be optional is also shown in Figure 8, in that the adjustment provided by the notches 32 of the upper insulating member and the tongue 33 on member 28 have been omitted. These adjustments may be obtained by frictionally moving member 28 with respect to insulating member 24. In many cases the force of spring 29 will be sufficient to prevent relative movements of parts 28 and 24, without the necessity of providing a positive holding means between these two.

In the design of a galvanometer for measuring the small E. M. F.'s developed by a thermocouple to obtain high sensitivity and yet avoid sluggish action of the moving element caused by overdamping, both the characteristics of the galvanometer and of the external circuit must be considered. The circuit resistance must be high enough to insure reasonable freedom from minor changes in resistance such as would be introduced by changes in length of lead wire, for example. In the galvanometer itself, among the more important things to consider are the strength of the magnetic field and the size and number of turns of wire used in the coil.

The introduction of magnets of higher strength than previously available for the purpose opens the way for producing instruments having a lower range than previously attainable for an otherwise similar instrument, preserving all of the desirable characteristics enumerated above, with the exception of damping. Without changing anything else, if the sensitivity of the galvanometer is increased by using a stronger magnet an instrument previously properly damped becomes badly over-damped and sluggish. This is because a greater back E. M. F. is developed in the turns of the moving coil as it moves through the magnetic field at a given rate. This back E. M. F. is in opposite direction to any applied E. M. F. or change in E. M. F. tending to cause the coil to move to a new position, hence the resultant current producing the motion is reduced to a greater extent, resulting in a decrease in the current operating to deflect the meter, with the result of the above-mentioned sluggishness.

Figure 2:
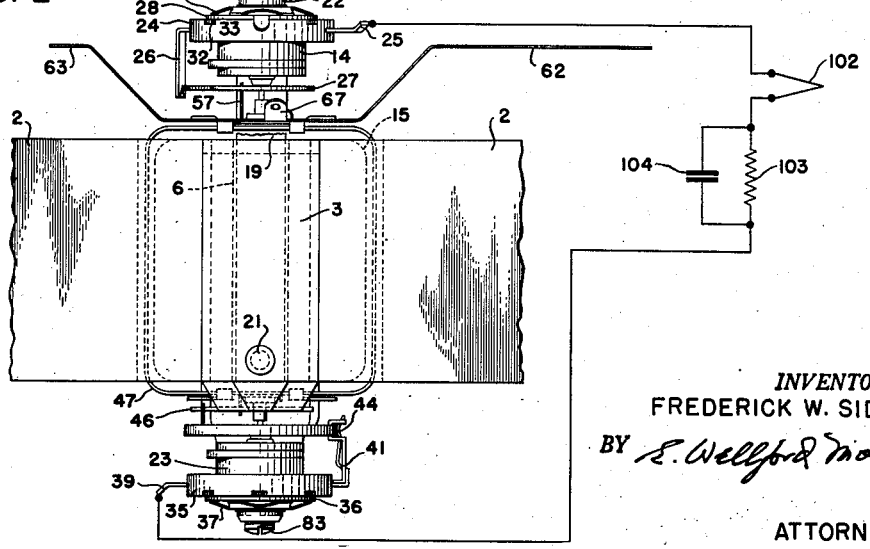
Figure 2 is a front view of a portion thereof.

I have discovered that the proper use of a condenser in the circuit of such an over-damped galvanometer has the effect of counteracting part or all of the over-damped effect and causes the instrument to operate with increased sensitivity without the added sluggishness otherwise incident to its increase in sensitivity. A circuit for the galvanometer is shown in Figure 2 in which a thermocouple 102 is connected in series with an external resistance 103 across the terminals 25 and 39 of the galvanometer coil 47. A condenser 104 may be connected in parallel across the coil 47 or across the resistance 103 as shown which is a portion of the resistance of the circuit that is external to the moving coil of the galvanometer. The remaining external resistance is in the thermocouple lead wires, the galvanometer leads, etc. A sudden increase applied to the circuit then produces an increase in the current through the moving coil 47 that is greater than it would be without condenser 104. This extra current being made possible by the fact that the potential across the condenser does not immediately rise to a proportionate new value so at first the entire increment of E. M. F. appears as an IR drop across the moving coil and only a portion of the circuit resistance, whereby the corresponding current increase is greater. The result is a stronger motor action upon the moving coil, moving it more rapidly in spite of accompanying increase in back E. M. F. As the coil continues to move the current flowing into the condenser brings its potential to the required new value corresponding to a state of equilibrium with the increased E. M. F. that is to be measured. When the capacitance of the condenser and the division of the circuit resistance are properly related to the design characteristics of the galvanometer, the moving coil can be brought to rest at the required new position as the condenser potential reaches the value of equilibrium. As concrete examples of the values of the electrical characteristics of the various circuit elements for a typical circuit the following are given. With an instrument having a span of 15 millivolts and a moving coil resistance of 46 ohms, it has been found that suitable sensitivity and damping characteristics will be obtained if a fixed external resistance of 58 ohms and a condenser of 1500 microfarads capacity are used. The remaining external resistance in most thermocouple circuits will be so small compared to the resistance mentioned that it may be neglected.

As a result of the operation of the circuit elements the change in reading of the pointer due to coil deflection as a result of the increase in E. M. F. will have been accomplished in a length of time well comparable with the time required in the case of the originally mentioned, properly damped instrument, without the higher sensitivity brought about by greater magnet strength.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure with Letters Patent is:

1. In a galvanometer, the combination of a magnet, pole pieces integrally attached to the poles thereof, spacers extending between and integrally attached to said pole pieces, said pole pieces and spacers being formed with a cylindrical opening, said spacers being formed with oppositely spaced locating surfaces, a cylindrical core, a part and a bracket integrally attached thereto at diametrically opposed portions of said core, said part and bracket being formed with locating surfaces cooperating with the locating surfaces in said spacers whereby said core will be concentric with the opening between said pole pieces to form two half-ring shaped spaces, said bracket being formed with a pair of tubular projections concentric with said core, a jewel bearing received in each of said tubular extensions, a coil surrounding said core in said half-ring shaped spaces, pivots extending symmetrically from said coil and received by said bearings, rotatable adjusting means received on the exterior of said projections, biasing means for said coil having a portion thereof attached to said coil and a portion thereof attached to said adjusting means whereby as said adjusting means is moved said coil will be moved through said biasing means to shift said coil in said half-ring shaped spaces, and a magnetic shunt adjustably attached to one of said spacers and projecting adjacent said pole pieces to vary the effect of said magnet on said coil.

2. In a galvanometer, a magnet assembly to set up a magnetic field, a coil assembly including a coil mounted for movement in said magnetic field, a pointer to indicate the position of said coil, and means to attach said pointer rigidly to said coil and in a definite relation thereto, a pair of arms projecting outwardly in opposite directions from the sides of said pointer, counterweights received by said arms, each counterweight being in the form of a helical coil of different diameters, the larger diameter of the coil being slidably received on an arm and the smaller diameter of each coil engaging an arm to cut grooves therein as said counterweight is moved into place.

3. In a galvanometer, a magnet assembly, a coil assembly received by said magnet assembly and including a coil movable in the field of said magnet, an upper and a lower bearing, a pivot for said coil received in each bearing, and means to fasten said pivots to said coil including a cup-shaped member attached to the top and to the bottom of said coil and coaxial with the pivotal axis thereof, the cup portion of each of said members being crimped to form three equally spaced inwardly projecting surfaces, said pivots being received by said cup-shaped members and frictionally engaged by said surfaces.

4. In a galvanometer, a magnet assembly to set up a magnetic field, a coil assembly including a coil to be moved in said magnetic field, means to support said coil for pivotal movement including a bearing, a pivot received in said bearing, a cup-shaped pivot support having three equally spaced surfaces to engage said pivot, and means to attach said pivot support to said coil including a part engaging said coil and having a depression therein, said pivot support being received in said depression and extending through an opening therein.

5. In a galvanometer, a magnet assembly to set up a magnetic field, a coil assembly including a coil to move in said magnetic field, means to support said coil for pivotal movement including a part attached to said coil and having a depression extending away from said coil with an opening in said depression, a member having a cup-shaped portion and a base, said base being received in said depression with the cup-shaped portion projecting through said opening, said cup-shaped portion having a plurality of equally spaced inwardly extending surfaces, a pivot frictionally engaged by said surfaces, and a bearing for said pivot.

6. In a galvanometer, a magnet assembly to set up a magnetic field, a coil assembly including a C-shaped bracket having a projection extending outwardly from an end thereof, a coil, means in said projection to support said coil for pivotal movement in said magnetic field, a hair spring, a temperature compensating spiral to which said hair spring is attached, an insulating member, mounting means for said spiral carried by said member, said member being provided with an opening so that it may be moved transversely into position on said projection with said hair spring and spiral in substantially concentric relation with said pivotal supporting means for the coil, and means to maintain said member on said projection with said parts in their normal positions.

7. In a galvanometer, a magnet assembly to set up a magnetic field, a coil assembly including a coil to move in said magnetic field, means to support said coil for pivotal movement, and temperature compensated terminal and biasing means for said coil including a hair spring, a bimetallic spiral upon which said hair spring is mounted, a support for said spiral, an insulating member to which said support is attached, a bracket upon which said insulating member is to be mounted, said insulating member having a slot therein by means of which it may be moved transversely to position on said bracket, and means to hold said insulating member on said bracket in a predetermined position.

8. In a galvanometer, a unitary magnet assembly including a magnet, pole pieces attached to said magnet and extending toward each other, non-magnetic spacers attached to each of said pole pieces located between and separating the same, a magnetic shunt piece attached to one of said spacers and being of such a width that it overlies a portion of each pole piece, and means to vary the distance of said magnetic shunt piece from said pole pieces.

9. In a galvanometer, a unitary magnet assembly including a magnet, pole pieces attached to said magnet and extending toward each other, spacers attached to each of said pole pieces and separating the same, a magnetic shunt piece attached at one end to one end of one of said spacers, said magnetic shunt piece being of a width to overlie a portion of each of said pole pieces and being provided near its other end with a depression, a screw threaded into said one of said spacers with the head thereof received in said depression whereby rotation of said screw will vary the distance between said magnetic shunt piece and said pole pieces.

10. In a galvanometer, the combination of a magnet assembly including a magnet, pole pieces attached to said magnet, and spacers located between and attached to said pole pieces and separating the same, said spacers including slots therein, a C-shaped bracket of non-magnetic material, a core of magnetic material integrally connected to said C-shaped bracket, a front piece of non-magnetic material fastened to said core diametrically opposite to said bracket, said C-shaped bracket and said front piece being located in and interfitting with said slots whereby said bracket and said core may be received by said spacers between said pole pieces so that said core is exactly located relative to said magnetic assembly, aligned tubular projections on the ends of said C-shaped bracket, jewel bearings received in said projections and coaxial with said core, terminals surrounding said projections, adjusting means for said terminals also surrounding said projections, a coil, pivots attached to said coil and received by said bearings, said coil encircling said core and being pivoted around an axis concentric therewith when said pivots are received by said bearings, and latch means to hold said bracket in position when said bracket is placed between said pole pieces.

FREDERICK W. SIDE.

REFERENCES CITED

The following references are of record in the file of this patent:

UNITED STATES PATENTS

| Number | Name | Date |
|---|---|---|
| 754,590 | Mitchell | Mar. 15, 1904 |
| 1,008,549 | Klinckert | Nov. 14, 1911 |
| 1,022,795 | McClair | Apr. 9, 1912 |
| 1,027,684 | Beede | May 28, 1912 |
| 1,154,979 | Ellis | Sept. 28, 1915 |
| 1,166,410 | Cornman | Dec. 28, 1915 |
| 1,227,468 | Mac Gahan | May 22, 1917 |
| 1,288,019 | Johnson | Dec. 17, 1918 |
| 1,306,624 | Porter et al. | June 10, 1919 |
| 1,639,365 | Brown | Aug. 16, 1927 |
| 1,695,422 | Grisdale et al. | Dec. 12, 1928 |
| 1,764,363 | Stalder | June 17, 1930 |
| 1,792,385 | Mathews | Feb. 10, 1931 |
| 1,824,561 | Miller | Sept. 22, 1931 |
| 1,885,052 | Smulski | Oct. 25, 1932 |
| 1,899,885 | Simpson | Feb. 28, 1933 |
| 1,963,283 | Triplett | June 19, 1934 |
| 1,976,498 | Houre | Oct. 9, 1934 |
| 2,013,229 | Andis | Sept. 3, 1935 |
| 2,111,001 | Norman | Mar. 15, 1938 |
| 2,179,305 | Stickney et al. | Nov. 7, 1939 |
| 2,221,643 | Federer | Nov. 12, 1940 |
| 2,309,927 | Beede | Feb. 2, 1943 |
| 2,381,936 | Sargent | Aug. 14, 1945 |
| 2,388,897 | Ammon | Nov. 13, 1945 |
| 2,429,757 | Hickok | Oct. 28, 1947 |
| 2,433,165 | Simpson | Dec. 23, 1947 |

FOREIGN PATENTS

| Number | Country | Date |
|---|---|---|
| 192,901 | Great Britain | Feb. 15, 1923 |
| 367,191 | Great Britain | Feb. 18, 1932 |
| 542,454 | Great Britain | Jan. 9, 1942 |